US012675311B2

(12) United States Patent (10) Patent No.: US 12,675,311 B2
Labriji et al. (45) Date of Patent: Jul. 7, 2026

(54) METHOD AND SYSTEM FOR REMOTE EXECUTION OF SERVICES REQUESTED BY A MOBILE DEVICE VIA A CELLULAR COMMUNICATION NETWORK

(71) Applicants: COMMISSARIAT A L'ENERGIE ATOMIQUE ET AUX ENERGIES ALTERNATIVES, Paris (FR); RENAULT SAS, Boulogne Billancourt (FR)

(72) Inventors: Ibtissam Labriji, Toulouse (FR); Emilio Calvanese Strinati, Grenoble (FR); Frédéric Joly, Valbonne (FR); Eric Perraud, Plaisance Du Touch (FR)

(73) Assignees: COMMISSARIAT A L'ENERGIE ATOMIQUE ET AUX ENERGIES ALTERNATIVES, Paris (FR); RENAULT SAS, Boulogne Billancourt (FR)

( * ) Notice: Subject to any disclaimer, the term of this patent is extended or adjusted under 35 U.S.C. 154(b) by 414 days.

(21) Appl. No.: 18/568,594

(22) PCT Filed: Jun. 10, 2022

(86) PCT No.: PCT/EP2022/065827
§ 371 (c)(1),
(2) Date: Dec. 8, 2023

(87) PCT Pub. No.: WO2022/258806
PCT Pub. Date: Dec. 15, 2022

(65) Prior Publication Data
US 2024/0272928 A1 Aug. 15, 2024

(30) Foreign Application Priority Data
Jun. 11, 2021 (FR) ...................................... 21 06200

(51) Int. Cl.
*G06F 9/45* (2006.01)
*G06F 9/455* (2018.01)
*H04W 36/32* (2009.01)

(52) U.S. Cl.
CPC .. *G06F 9/45558* (2013.01); *G06F 2009/4557* (2013.01); *H04W 36/326* (2023.05)

(58) Field of Classification Search
CPC ......... G06F 9/45558; G06F 2009/4557; G06F 9/4856; H04W 36/326; G06N 7/01; G06N 5/01
See application file for complete search history.

(56) References Cited

U.S. PATENT DOCUMENTS

| | | | | |
|---|---|---|---|---|
| 2014/0324766 A1* | 10/2014 | Alboszta | ................... | G06N 7/01 706/57 |
| 2020/0249039 A1 | 8/2020 | Lassoued et al. | | |
| 2020/0265830 A1* | 8/2020 | Wang | ..................... | G06N 3/084 |

FOREIGN PATENT DOCUMENTS

WO WO-2022085014 A1 * 4/2022 .......... G06F 11/3476

OTHER PUBLICATIONS

International Search Report issued Aug. 4, 2022 in PCT/EP2022/065827 filed on Jun. 10, 2022, 9 pages (with English Translation).
(Continued)

*Primary Examiner* — Craig C Dorais
(74) *Attorney, Agent, or Firm* — Oblon, McClelland, Maier & Neustadt, L.L.P.

(57) ABSTRACT
The invention relates to a method and system for remote execution services requested by at least one mobile device via a cellular communications network according to a communication protocol which is at least fourth-generation, a service being executed by a virtual machine of a current host server. The method comprises, for a given service request,
a) calculating (52) a probabilities vector containing K components, each component being associated with a given moment in time from a set of K moments in time,
b) selecting (54) a migration moment in time based on the calculated probabilities vector,
c) determining (56) a number of replications of the virtual machine to be carried out at the selected migration moment in time in order to minimize a replication energy cost while providing a level of service continuity and calculating (56) a predicted gain for the migration.

20 Claims, 6 Drawing Sheets

(56)           References Cited

OTHER PUBLICATIONS

French Preliminary Search Report issued Feb. 25, 2022 in French Patent Application No. 21 06200 filed on Jun. 11, 2021, 5 pages (with English Translation of Categories of Cited Documents).

Labriji et al., "Mobility Aware and Dynamic Migration of MEC Services for the Internet of Vehicles", IEEE Transactions on Network and Service Management, vol. 18, No. 1, Mar. 1, 2021, pp. 570-584, XP011842204.

Labriji et al., "On Seamless Offloading of Delay Sensitive Vehicular Services over Mobile Edge Computing", IEEE Globecom Workshops, 2020, 6 pages, XP055895590, Retrieved from the Internet: https://ieeexplore.ieee.org/stampPDF/getPDF.jsp?tp=&arnumber=9367409&ref=aHR0cHM6Ly9pZWVleHBsb3J1Lml1ZWUub3JnL2RvY3VtZW50LzkzNjc0MDk=.

Mach et al., "Mobile Edge Computing: A Survey on Architecture and Computation Offloading", IEEE Communications Surveys & Tutorials, vol. 19, No. 3, 2017, pp. 1628-1656, XP055895691, Retrieved from the Internet: https://ieeexplore.ieee.org/stampPDF/getPDF.jsp?tp=&arnumber=7879258&ref=aHR0cHM6Ly9pZWVleHBsb3J1Lml1ZWUub3JnL2RvY3VtZW50Lzc4NzkyNTg=.

* cited by examiner

METHOD AND SYSTEM FOR REMOTE EXECUTION OF SERVICES REQUESTED BY A MOBILE DEVICE VIA A CELLULAR COMMUNICATION NETWORK

The present invention relates to a method and a system for remote execution of services required by at least one mobile device, in particular on board a vehicle, via a cellular communication network according to a communication protocol of at least fourth generation.

The invention relates to the remote execution of services for mobile devices, especially vehicles, in particular in the context of the Internet of Vehicles (IOV).

Fourth generation, 4G, and even more fifth generation, 5G, cellular communication technologies provide the possibility to communicate significant amounts of data, at low latency and with guaranteed quality of connectivity for equipment in motion. As a result, in the field of connected vehicles, communication can be developed between vehicles and remote servers, Intelligent Transport Systems (ITS), and more generally the implementation of various services for various types of applications.

The term service refers herein to any software application implementing exchanges of data. For example, in the case of connected vehicles, services include driving assistance services, road traffic management (e.g. upstream transmission of information on road congestion, on accidents, allowing alternative routes to be planned), and the provision of infotainment.

The technology of remote Mobile Edge Computing (MEC), developed within the framework of fifth generation cellular communication networks, is used for off-setting software applications consuming computing resources to remote computing servers (MEC servers), placed at the periphery of the communication network. It is also possible to off-set such software applications to other remote servers (e.g. servers forming a "cloud"). Thereby, the network of remote servers, such as MEC or "cloud" network, becomes a virtual electronic control unit (ECU) for any mobile device (e.g. vehicle) connected.

A major technological challenge is to ensure a satisfactory level of service quality for vehicles that are in motion. Indeed, in a manner known in the field of cellular communications, by moving, the user equipment changes the geographical area of coverage, and thus it is necessary to ensure a continuity of communications, by handover mechanisms defined by telecommunications standards. Similarly, the motion of a vehicle means moving farther from a host server or MEH (for "Mobile Edge Host") which executes a service, and there is then a risk of interruption, so the continuity of service is not ensured.

The management of the remote execution of services taking into account the mobility of vehicles, in an efficient way in terms of resources used and while guaranteeing the required level of continuity of service, is a problem to be solved.

To solve the problem, it has been proposed to perform migrations of a virtual machine running a service on one or a plurality of host servers associated with geographical areas of communication coverage, adjacent to the current geographical area of coverage of a vehicle, which are likely to be crossed by the vehicle with a certain associated probability.

Migration includes stopping execution by the current host server at a runtime instance, and a replication of the virtual machine to each scheduled host server. Replication consists of the complete recopy of a runtime instance of the service, and a runtime context (variables, parameters), also called the runtime instance status. Recovery from execution can only be performed when replication is complete and successfully performed. Incomplete or incorrect replication can result in an interruption of the service.

A possible solution would be to choose a single host server predicted for migration, and thus to perform a single replication of virtual machine. In such case, the consumption of resources is limited, but the risk of service interruption in the event of a host server prediction error, is high.

Alternatively, a full replication on all available host servers would provide a guarantee of continuity of service, but with a high cost of consumption of computational resources and a high cost of replication energy.

The article "Mobility aware and dynamic migration of MEC services for the Internet of Vehicles" by Ibtissam LABRIJI et al, published in IEEE Transactions on Network and Service Management 2021, Vol. 18, no. 1, pages 570-584, proposes a partial replication, the number of replications being calculated in such a way as to minimize a replication energy cost while limiting the risk of loss of continuity of service.

In addition to the number of replications of virtual machines to be performed during the migration, there is the question of the timing of the migration trigger, for each service request issued by a vehicle, while maintaining a goal of minimizing the cost of replication energy and limiting the risk of loss of continuity of service.

To this end, the invention proposes a method of remote execution of services required by at least one mobile device, in particular on board a vehicle, via a cellular communication network according to a communication protocol of at least fourth generation, a service being executed by a virtual machine of a computing server, known as the current host server, the mobile device sending a service request having a position belonging to a geographical area of current cellular communication coverage, the current host server being associated with the current geographical area of coverage. The method comprises the following steps, implemented by a processor of said current host server, for a given service request received during a current time interval:

a) for the current time interval, calculation of a probability vector with K components, each component being associated with a given moment of time of a set of K predetermined instants, each component of the probability vector corresponding to a probability of migration at the associated moment of time, the migration consisting of at least one replication of the virtual machine executing said service on a chosen host server belonging to a geographical area of coverage contiguous to said geographical area of current coverage, the calculation of the components of the probability vector implementing a set of K weights, each weight being associated with a migration moment of time and representative of a gain predicted for a migration at said associated migration moment of time, b) selection from said set of K moments of time of a moment of time, referred to as the selected migration moment of time, according to the calculated probability vector, the selected migration moment of time having a maximum corresponding probability of migration in the calculated probability vector, c) determination, for the migration at the selected migration moment of time, of a number of replications of the virtual machine to be performed at the selected migration moment of time so as to minimize a cost in terms of replication energy while ensuring a level of continuity of service, and calculation of a predicted gain for said migration at the selected migration moment of time.

Advantageously, the method of remote execution of services required by at least one mobile device, in particular on board a vehicle, is used for choosing a migration moment of time from a set of moments of time, so as to optimize an associated predicted gain.

Moreover, the method serves to obtaining jointly a migration moment of time and a number of replications to be performed.

The method of remote execution of services required by at least one mobile device, in particular on board a vehicle according to the invention can further have one or a plurality of the features hereinbelow, taken independently or according to all technically feasible combinations.

The method further includes a storing of the selected migration moment of time and the number of replications of the virtual machine to be performed for said given service request.

The method is implemented by said current host server for a plurality of service requests over a succession of time intervals and includes a step d) [of] updating the weight associated with the selected migration moment of time, for a subsequent time interval, the update depending on said predicted gain, and repeating the steps a) to d) for the next time interval.

The update of the weight implements an exponential function of said predicted gain, and the probability associated with the migration moment of time selected for the current time interval.

The weight associated with the selected moment of time for the following time interval is obtained by the formula:

$$\omega_{k*}(t+1) = \omega_{k*}(t)e^{\frac{\rho x_{k*}(t)}{Kp_{k*}(t)}}$$

Where k* is the index of the selected migration moment of time, $\omega_{k*}(t)$ is the weight associated with the selected moment of time for the current time interval (t), $\omega_{k*}(t+1)$ is the weight associated with the selected moment of time for the next time interval (t+1), $\rho$ is a weighting parameter, $p_{k*}(t)$ and is the probability associated with the selected migration moment of time.

For the current time interval, the probability associated with the moment of time $T_k$ of index k is calculated by the formula:

$$p_k(t) = (1-\rho)\frac{\omega_k(t)}{\sum_{j=1}^{K} \omega_j(t)} + \frac{\rho}{K} \text{ for any } k \in \{1, 2, \ldots, K\}$$

The weighting parameter is calculated dynamically based on a calculation of cumulative global gain for each moment of time, the cumulative global gain being incremented, for each moment of time, for each service request processed, by the predicted gain for migration when said moment of time is selected as the migration moment of time.

The weighting parameter value is changed when the maximum cumulative overall gain among said calculated overall gains exceeds a threshold depending on the number of moments of time.

The determination, for a migration at the selected migration moment of time, for each service request, of a number of replications of the virtual machine to be performed at the selected migration moment of time, each replication being performed on a selected host server, implements a minimization of an target function depending on an energy consumed for said number of replications, under the constraint of a risk metric associated with the accessibility of the host server(s) chosen for the replication and of an availability metric, for each replication, of the virtual machine after a replication triggered at the selected migration moment of time.

The risk metric uses a probability representative of a prediction of mobility, associated with each selected host server, representative of the probability that the mobile device sending said service request enters a geographical coverage area associated with said selected host server.

For a chosen migration moment of time, and for a given request r(t), said risk metric is defined by $$\text{Risk}\left(r(t), k^*, M_r^{k^*}(t)^*\right) = 1 - \sum_{i=1}^{M_r^{k^*}(t)^*} p_{r,k*,i}^s(t)$$

Where k* is the index of the selected migration moment of time, $$M_r^{k^*}(t)^*$$

is the number of replications of the optimal virtual machine calculated, and $$p_{r,k^*,i}^s(t)$$

is the probability representative of a prediction of mobility associated with a host server of index i.

The availability metric uses, for each virtual machine replication, a comparison of a migration moment of time of the virtual machine and a time remaining before a change of host server for the mobile device that issued the service request.

The energy consumed is calculated based on the number of replications and a size of the virtual machine to be migrated.

The determination, for the migration at the selected migration moment of time, for each service request, of a number of replications of the virtual machine to be performed at the selected migration moment of time implements, for a plurality of service requests received over a current time interval, a mean risk calculation and a mean availability calculation over said plurality of requests.

The mean risk calculated for the current time interval is used to construct a first virtual queue, for a subsequent time interval, according to an associated first control parameter, and said mean availability is used to construct a second virtual queue, for a subsequent time interval, depending on an associated second control parameter, the objective function to be minimized being dependent on said first and second virtual queues.

For a given service request, and for a selected migration moment of time, the predicted gain is equal to the value of said objective function for the determined number of replications of the virtual machine.

A maximum number of candidate host servers is associated with each moment of time, the maximum number of candidate host servers associated with each moment of time being decreasing in the ascending order of the moments of time.

According to another aspect, the invention relates to a system for remote execution of services required by at least one mobile device, in particular on board a vehicle, the system comprising a cellular communication network according to a communication protocol of at least fourth generation, and a plurality of calculation servers, a service being executed by a virtual machine of a calculation server, called the current host server, the vehicle sending a service request having a position belonging to a geographical area of current cellular communication coverage, with said current host server associated with the current geographical area of coverage, said current host server including a processor configured to implement, for a given service request received during a current time interval forming part of a succession of time intervals:

a module for calculating, for the current time interval, calculation of a probability vector with K components, each component being associated with a given moment of time of a set of K predetermined moments, each component of the probability vector corresponding to a probability of migration at the associated moment of time, the migration consisting of at least one replication of the virtual machine executing said service on a chosen host server belonging to a geographical area of coverage contiguous to said geographical area of current coverage, the calculation of the components of the probability vector implementing a set of K weights, each weight being associated with a migration moment of time and representative of a gain predicted for a migration at said associated migration moment of time, a module for selecting, from said set of K moments of time, a moment of time, referred to as the selected migration moment of time, according to the calculated probability vector, the selected migration moment of time having a maximum corresponding probability of migration in the calculated probability vector, a module for determining, for the migration at the selected migration moment of time, a number of replications of the virtual machine to be performed at the selected migration moment of time so as to minimize a cost in terms of replication energy while ensuring a level of continuity of service, and calculation of a predicted gain for said migration at the selected migration moment of time.

According to one embodiment, the system further includes a module for updating the weight associated with the selected migration moment of time, for a subsequent time interval, the update depending on said predicted gain.

Advantageously, the system is configured to implement a method of remote execution of services required by at least one mobile device, as briefly described hereinabove, according to all the embodiments envisaged.

According to another aspect, the invention relates to a computer program including software instructions which, when executed by a programmable electronic system, implement a method of remote execution of services required by at least one mobile device as briefly described hereinabove.

Other features and advantages of the invention will be clear from the description thereof which is given below as a non-limiting example, with reference to the enclosed figures, among which:

FIG. 1 schematically illustrates a cellular communication network wherein the invention is applied;

Figure 4:
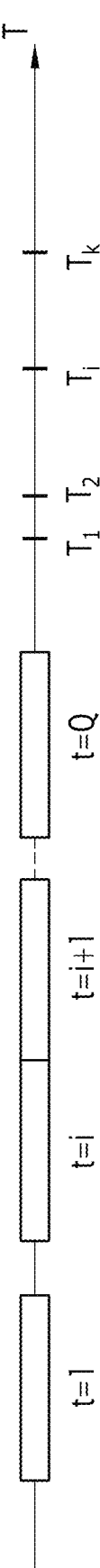
Figure 4:
Figure 5:
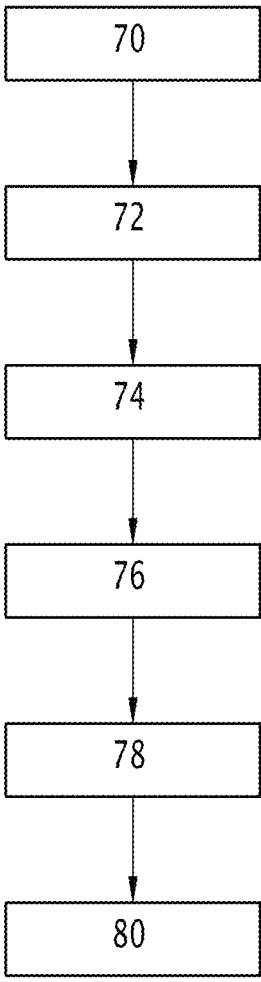
Figure 6:
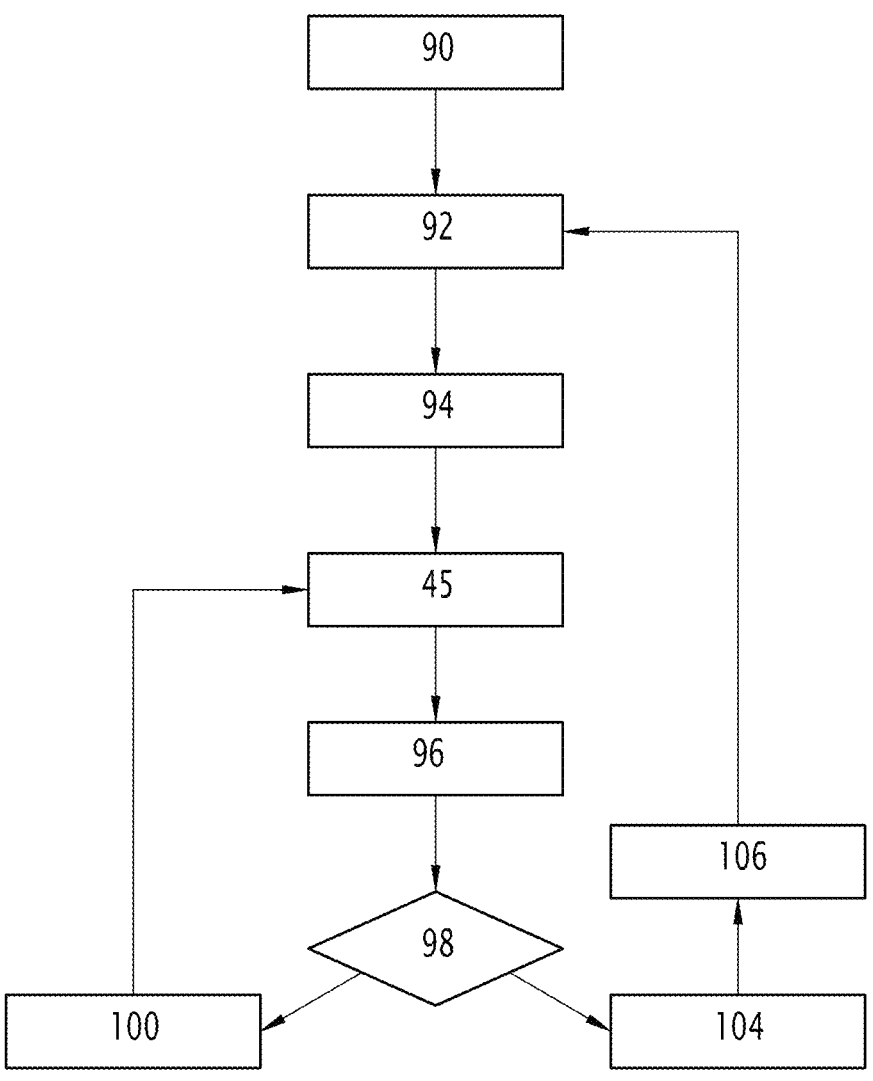

FIG. 4 schematically illustrates a time axis of application of a method of remote execution of services according to one embodiment;

FIG. 5 is a flow chart of the main steps implemented for determining a number of replications of the virtual machine to be performed at a selected moment of time and calculating an associated gain according to one embodiment;

FIG. 6 is a flow chart of the main steps of path generation method according to a second embodiment.

The invention applies to a mobile device, e.g. a device on board a moving vehicle or a vehicle equipped with the ability to connect to a communication network, and it is the latter case of application which is described in detail hereinafter.

Figure 1:
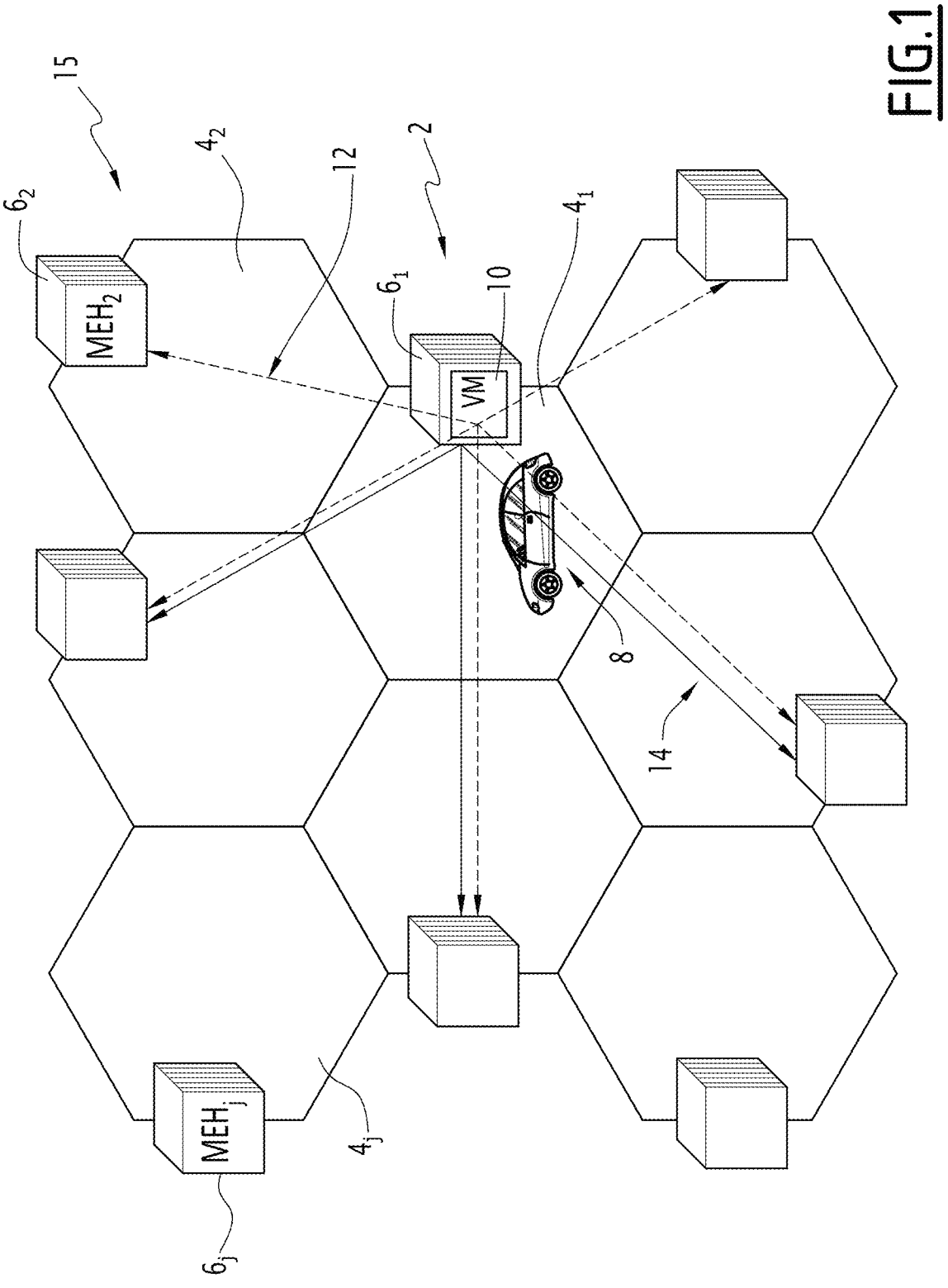

FIG. 1 schematically illustrates a set of geographical coverage areas of a cellular communication network 2.

The geographical areas $4_1$, $4_2$, . . . , $4_j$ are represented schematically.

The communication network 2 is a communication network according to a radio communication protocol of at least fourth generation, 4G, or fifth generation, 5G.

Each geographical area corresponds to a cell of the communication network and comprises communication equipment (not shown) (access points, base stations, etc.).

In addition, each cell comprises or is associated with a calculation server 6), or host server called $MEH_i$ (standing for Mobile Edge Host), which is a physical server with a calculation capacity. In an MEC, a plurality of MEH servers are connected, via an either wired or wireless link, for managing remote services (e.g. execute the virtual machines). A MEH can be placed either in a base station ("colocated") or associated with a plurality of base stations.

The set of computing servers $6_j$, suitable for communicating with each other, forms a "cloud of computing devices" 15.

FIG. 1 diagrammatically shows a vehicle 8, e.g. a motor vehicle, which has the ability to move and which is equipped with a communication interface (not shown in FIG. 1) according to the 4G or 5G communication protocol.

The invention applies more generally to any mobile device, equipped with a 4G or 5G, and beyond, communication interface, which can move between geographical areas, e.g. a terminal, a mobile telephone, a tablet, vehicles, etc.

More generally, the invention applies in any system that uses wireless communication between a node and one or more host servers that run services for said node and is of particular interest to any mobile node for which there is a position uncertainty at the time of handover.

Of course, the invention applies to any type of land vehicle, and also to other types of vehicles such as e.g. drones.

At a current moment of time, the vehicle 8 is located at a given spatial position, belonging to a current geographical coverage zone, which is the zone $4_1$ in the example shown in FIG. 1. The vehicle 8 is then apt to exchange data and to request the execution of one or a plurality of services from the host server $6_1$ associated with the zone $4_1$, which is the host server $MEH_1$, also called the current host server $MEH_c$.

The execution of a service is performed by a virtual machine or VM 10.

A virtual machine refers herein to a computing software unit that virtualizes (or emulates) a computing system, in various known types of implementations, in the form of a container or other, e.g. Docker (open source software for launching applications in software containers), Solaris Containers, OpenVZ, Linux-VServer, LXC, AIX Workload Partitions, Parallels Virtuozzo Containers, iCore Virtual Accounts.

The term service refers herein to any software application implementing exchanges of data, e.g., in the case of connected vehicles, services include driving assistance services, road traffic management and the provision of infotainment.

A plurality of predefined classes of service can be distinguished.

The service or software application implemented is a stateful app. Replication of a virtual machine for executing a service consists of the complete copying of a runtime instance of the service, and an execution context (variables, parameters), or status of the runtime instance.

When the vehicle 8 is moving, same may leave the geographical zone $4_1$, for one of the adjacent zones. By hypothesis, the future geographical area of coverage of the vehicle in question is not known.

For continuity in the execution of the services, provision is made to replicate the virtual machine VM 10 to one or a plurality of the host servers $6_i$ associated with the geographical coverage zones $4_i$ adjacent (or contiguous) to the current zone.

The current host server MEHc initiates a migration consisting in replicating the VM 10 on one or a plurality of host servers $6_i$ which is represented schematically by arrows in FIG. 1.

To this end, the host server implements a method which will be described in greater detail hereinafter, which makes it possible to determine, for each service request coming from a vehicle, when (i.e. at what moment of time), how many replications to make and to which host server(s), based on a gain dependent on replication energy, and based on a chosen level of continuity of service, taking into account a risk metric associated with the accessibility of the chosen host server(s) (risk associated with a probability that the moving vehicle will enter a coverage area associated with each chosen host server) and a VM replication availability metric.

For example, a level of continuity of service is defined by a value of the risk metric and a value of the availability metric, which ensures that these metrics are met within such framework.

FIG. 1 diagrammatically shows two migrations by arrows starting from the host server $MEH_c$: a first set of arrows 12 (in dotted lines) representative of a first migration, at a moment of time $T_1$, corresponding to five replications in the present example; a second set of arrows 14 (in solid lines) representative of a second migration, at a moment of time $T_2$, subsequent to $T_1$, corresponding to three replications in the present example. The moments of time $T_1$, $T_2$ are both future moments with respect to the current moment when the vehicle is in the position shown. It should be understood that between the moment of time $T_1$ and the moment of time $T_2$, the vehicle will have moved, and the number of available host servers will be smaller.

Advantageously, the proposed method makes it possible to ensure a level of continuity of service when the vehicle 8 changes geographical area of network coverage, in particular in the case of rapid mobility of the vehicle 8, for services sensitive to transmission delays ("delay sensitive applications").

Figure 2:
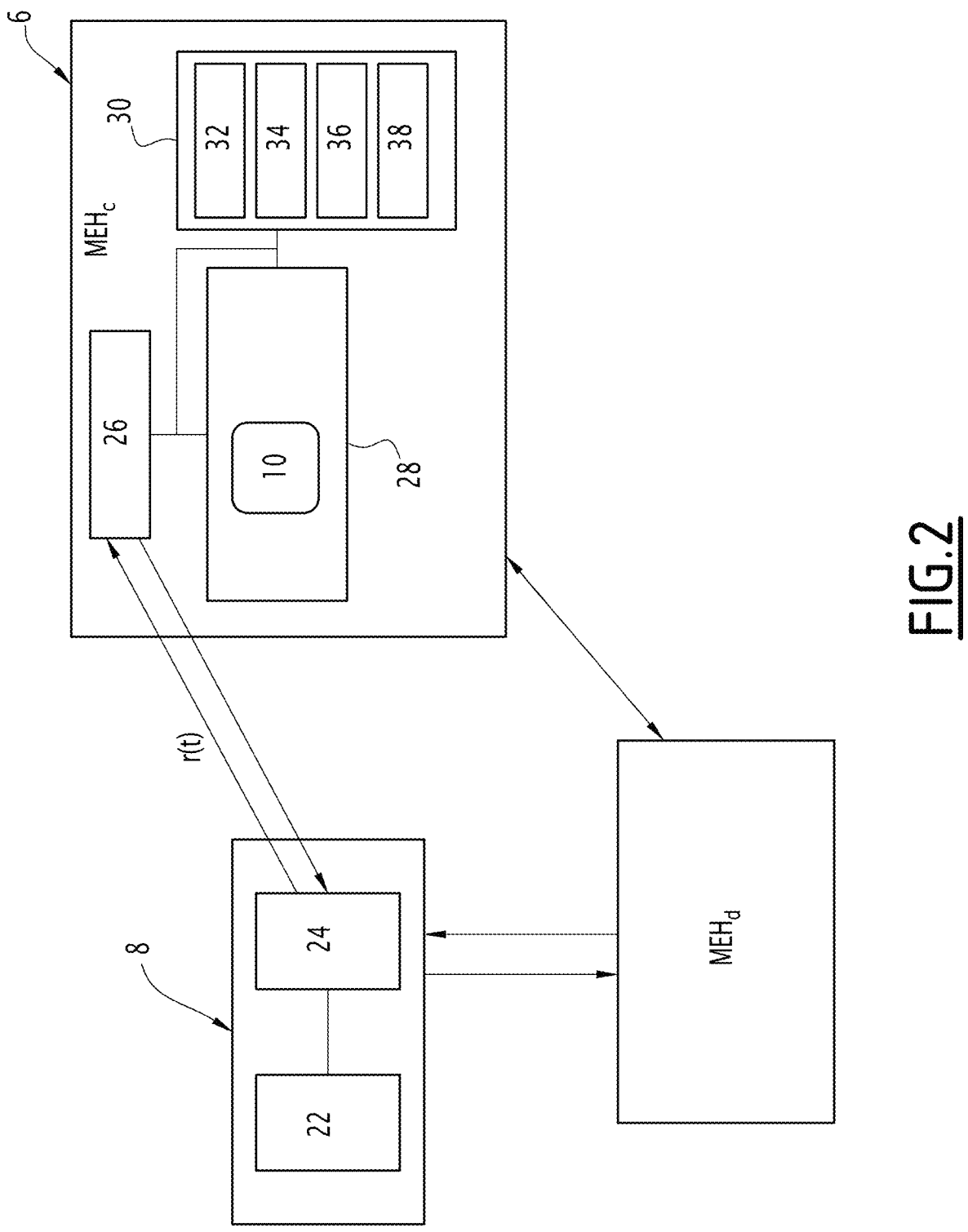
FIG. 2 is a block diagram of a system for remote execution of services.

FIG. 2 is a flow diagram of the functional blocks of a system of remote execution of services according to the invention.

The system 20 comprises a vehicle 8 and a plurality of host servers $MEH_c$, $MED_d$, suitable for communicating with each other, and forming an MEC.

It is understood that the system represented in FIG. 2 is simplified, the number of host servers being any number. Moreover, in practice, a current host server is suitable for receiving service requests from a plurality of vehicles.

The functional blocks of a host server 6 ($MEH_c$) are represented in detail, the host server being a current host server $MEH_c$ configured to implement the method of remote execution of services.

The vehicle 8 comprises an on-board electronic control unit (ECU) 22 and a communication interface 24 according to the chosen cellular communication protocol, e.g. the 5G protocol.

The ECU 22 is an electronic computing device, e.g. an on-board computer, including in particular a computing processor and an electronic memory.

The ECU 22 is suitable for communicating with the communication interface 24 via a two-way communication bus, for the exchange of data, commands, requests, responses. In particular, the ECU 22 is suitable for sending service requests to a host server $MEH_c$, e.g. a request r(t) sent during a time interval t.

Each host server MEH 6 further includes a communication interface 26, according to the cellular communication protocol chosen, e.g. the 5G protocol.

The host server 6 is a programmable electronic device, which further comprises a calculation unit 28 comprising one or a plurality of calculation processors and an electronic memory unit 30. The communication interface 26, the calculation unit 28 and the electronic memory unit 30 are suitable for communicating via a communication bus.

The calculation unit 28 implements a VM 10 for the execution of the request r(t), sent by a vehicle for the execution of a service.

Furthermore, the calculation unit 28 is configured to implement, for each request and for successive time intervals:

a module 32 for calculating a probability vector with K components, each component being associated with a given moment of time of a set of K predetermined moments of time, each component of the probability vector corresponding to a probability of migration at the associated moment of time, the migration consisting of at least one replication of the virtual machine executing the service on a host computing server belonging to a geographical area of coverage contiguous to said current geographical area of coverage, the probability being calculated as function a weight depending on the associated moment of time;

a module 34 for selecting a moment of time, called the selected migration moment of time, based on the calculated probability vector, a module 36 for determining, for the migration at the selected migration moment of time, a number of replications of the virtual machine to be performed at the selected moment of time so as to minimize a cost in terms of replication energy while ensuring a level of continuity of service, and calculation of gain associated to said migration at the selected migration moment of time, and a module 38 for updating the weight associated with the selected moment of time according to the calculated gain.

In one embodiment, the modules 32, 34, 36, 38 are each implemented in the form of a software program or a software brick executable by the calculation unit 28 and stored in the memory 30. The modules then form a computer program including software instructions which, when executed by a programmable electronic system, implement a method of remote execution of services required by a mobile device. This computer program can be recorded on any computer-readable non-volatile recording medium, e.g. any type of non-volatile memory (EPROM, EEPROM, FLASH, NVRAM), a magnetic card or an optical card.

In a variant (not shown), the modules 32, 34, 36, 38 are each embodied in the form of a programmable logic component, such as an FPGA (Field Programmable Gate Array), GPU (graphic processor) or a GPGPU (General-purpose processing on graphics processing), or further in the form of a dedicated integrated circuit, such as an ASIC (Application Specific Integrated Circuit).

Figure 3:
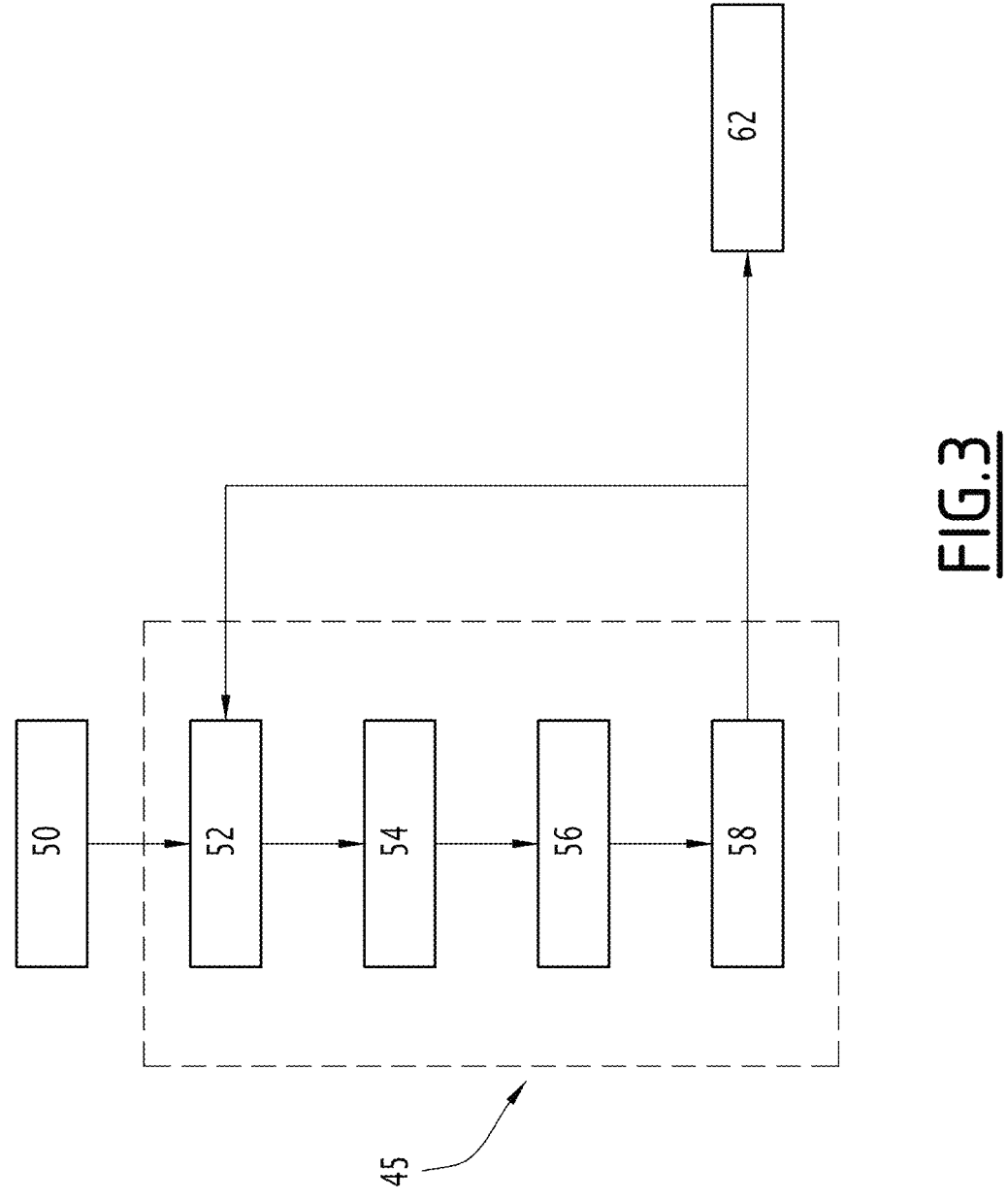
FIG. 3 is a flow chart of the main steps of method of remote execution of services according to a first embodiment.

FIG. 3 is a flow chart of the main steps of a method for executing remote services according to a first embodiment, implemented by a calculation unit of a current host server.

The method is described below in the case of reception of a service execution request from a vehicle but applies in a similar manner to each request received by the current host server, coming from the same vehicle or from a plurality of vehicles.

The method starts in a first time interval t=1 (t represents herein a time interval number in a succession of time intervals), and is executed over a plurality of successive time intervals, as illustrated schematically in FIG. 4, e.g. Q time intervals, Q being a given integer.

The duration of each time interval is chosen, e.g. it is fixed or is variable according to a number of requests to accumulate before starting the execution. The number of requests is greater than or equal to 1, and e.g. comprised between 2 and 100. Such requests are received by the current host server from one or a plurality of vehicles.

In one embodiment, the processed requests are requests for services likely to be migrated, e.g. from vehicles located at a distance less than a threshold distance from an edge of the coverage area.

The method comprises a step of reception of a service request r(t) and of initialization of the parameters for the current time interval t, which is the interval t=1.

The purpose of the method is to determine a migration trigger moment of time, simply referred to thereafter as the migration moment of time, for executing the or each service request received, from among a set of K predetermined moments of time: $\{T_1, \ldots, T_i, \ldots T_K\}$.

In the following, the method shown in FIG. 3 is described for processing a service request coming from a vehicle.

An example of moments of time $T_1, \ldots, T_i, \ldots T_K$ is illustrated on the time axis represented in FIG. 4: the moments of time are ordered in the ascending order of the indices, the instant $T_{i+1}$ being subsequent to the instant $T_i$.

In one embodiment, the set of K moments of time is determined as a function of a number of neighboring host servers (i.e. associated with geographical coverage areas contiguous to the current geographical area in which the requesting vehicle is located) candidates for the migration at each moment of time $T_k$.

Thereby, $$N_{MEH}^k$$

represents the number of candidate neighbor MEH servers when the migration is initiated at the moment of time $T_k$. The moments of time are chosen so that the numbers of associated candidate host servers are different, e.g. decreasing, in the order of increasing indices $$N_{MEH}^1 > N_{MEH}^2 > \ldots > N_{MEH}^K, \text{ up to } N_{MEH}^K = 1.$$

The number K is any integer, depending on the topology of the communication network, e.g. an integer greater than or equal to 2.

At each moment of time $T_k$ is associated an option $\theta_k(t)$ representative of the selection or non selection, at the time interval t, of the migration of the VM at the moment of time $T_k$. In other words:

$\theta_k(t)=1$ if the moment of time $T_k$ is selected as the migration initiation moment during the execution of the method at the time interval t; and $\theta_k(t)=0$ otherwise.

The method implements a probabilistic optimization algorithm such as "exploit or explore", over a succession of time intervals.

Initial values of weight associated with the moments of time, $\omega_k(t)$, as well as an initial value of the weighting parameter $\rho$, comprised between 0 and 1 and representative of a weighting between the options "exploit" or "explore", are obtained in the initialization step 50. Such initial values are e.g. supplied by an operator, or read from a memory, or else are set by default.

For example, in one embodiment, the weighting parameter $\rho$ takes a value provided by the formula:

$$\rho = \min\left\{1, \sqrt{\frac{K ln(K)}{(e-1)g_b}}\right\} \qquad \text{[MATH 1]}$$

Where $g_b$ is a given value, representative of an upper bound of the total gain, defined by the following formula as a function of a gain $x_x(t)$ defined below:

$$g_b = \max_{1 \le k \le K} \sum_{t=1}^{T} x_k(t)$$

Each weight $\omega_k(t)$, associated with the moment of time $T_k$, is calculated as a function of a gain predicted for a migration at said associated moment of time $T_k$.

The method comprises a step 52 of calculating a first probability vector P(t) with K components, each component $p_k(t)$ being a probability value of migration of the VM at the moment of time $T_k$ calculated for the time interval t:

$$p_k(t) = (1-\rho)\frac{\omega_k(t)}{\sum_{j=1}^{K} \omega_j(t)} + \frac{\rho}{K} \text{ for any } k \in \{1, 2, \ldots, K\} \qquad \text{[MATH 2]}$$

Thereby, for each moment of time $T_k$, the calculated probability of migration is a sum between a first term depending on the weight values associated with each moment of time, representative of an empirically predicted gain, and a second term of uniform distribution.

The method then comprises a step 54 of selecting a moment of time $T_{k*}$, referred to as the selected migration moment of time, as a function of the first calculated probability vector. The selected moment of time is the moment that maximizes the probability $p_k(t)$:

$$k^* = \mathrm{Argmax}_{j=1\,\ldots\,K}(p_j(t)) \qquad \text{[MATH 3]}$$

The option $\theta_{k*}(t)$ is enabled, i.e. set to 1, the other values of $\theta_j(t)$ being 0.

In the particular case where a plurality of migration moments have the same probability equal to the maximum value among the probabilities $p_k(t)$, it is possible to use any metric to finalize the selection of a moment of time, e.g. a drawing of lots between scenarios with the same probability of migration, or the selection of the first result obtained with the maximum probability.

The method then comprises a determination step 56, for the migration at the selected migration moment of time $T_{k*}$, a number of replications of the virtual machine to be performed from the selected moment of time so as to minimize a cost in terms of replication energy while ensuring a level of continuity of service, and to calculate a predicted gain for said migration at the selected migration moment of time. In addition to the number of replications, the host servers to use for the replications are also determined.

An implementation of the determination step 56 will be discussed in detail hereinafter with reference to FIG. 5. Advantageously, an algorithm based on a Lyapunov optimization is implemented.

The predicted gain at the time interval t for the migration at the moment of time $T_{k*}$ of all the requests received at t is denoted by $x_{k*}(t)$ The method further comprises a step 58 for updating the weight associated with the moment of time $_{k*}$ for the following time interval t+1.

$$\omega_{k*}(t+1) = \omega_{k*}(t)e^{\frac{\rho x_{k*}(t)}{K p_{k*}(t)}} \qquad \text{[MATH 4]}$$

For index values k different from k*, the weight values are unchanged:

$$\omega_k(t+1) = \omega_k(t), \forall\, k \neq k^* \qquad \text{[MATH 5]}$$

In one embodiment, the updating of the weights is performed for all the requests received during the current time interval, and which belong to the same service class, the service classes being predefined.

Step 58 is followed by a step 62 for storing, for the or each request considered, the decision of migration $\theta_{k*}(t)$, specifying the instant $T_{k*}$ selected for the migration, as well as the number $$M_r^{k^*}(t)$$

of replications to be performed, as determined in step 56. The host servers of the replications are $$M_r^{k^*}(t)$$

host servers selected during step 56, based on a probability representative of an associated prediction of mobility, representative of the probability that the vehicle will move into a coverage area with which a selected host server is associated.

An effective triggering of the migration by replication(s) of the VM at the moment of time $T_{k*}$ will be carried out later according to the stored information (number of replications, replication host servers).

Steps 50 to 58 are iterated for the next time interval t+1 for one or a plurality of new requests, coming from the same vehicles or from other vehicles.

The algorithm described above with reference to FIG. 3 is a decision algorithm based on the algorithm known as EXP3 (Exponential weight algorithm for Exploration and Exploitation), which advantageously implements a determination of gain associated with the triggering of the migration at the moment of time $T_{k*}$. The calculation of the gain will be discussed in detail hereinafter. The calculation is based on a minimization of the replication energy for a number $$M_r^{k^*}(t)$$

of replications to be performed during the migration at the moment of time $T_{k*}$, and compliance with a risk constraint (risk of loss of continuity of service) and a VM availability constraint (full replication at the moment when the vehicle changes the geographical coverage area thereof).

FIG. 5 is a flow chart of the main steps implemented for determining a number of replications of the virtual machine to be performed at a selected moment of time, for one or each request, and the calculation of an associated gain according to one embodiment.

In such embodiment, a Lyapunov optimization is implemented.

The method for determining a number of replications is implemented for a time interval t, and for a plurality of execution requests r, coming from one or a plurality of vehicles, received during the time interval t.

The method applies similarly to the processing of each request.

The method comprises a step 70 of calculation of the energy consumed for the migration, for all the requests considered during the time interval t.

The energy consumed during the migration of the VM which processes a request, for a number $$M_r^k(t)$$

of replications, is calculated, in one embodiment, by the following formula:

$$E_r(t) = M_r^k(t)\,\psi_r \qquad \text{[MATH 6]}$$

Where $$M_r^k(t)$$

the number of replications performed when the migration is triggered at the moment $T_k$, and $\psi_r$ or the energy consumed for a replication of the VM which processes the request r.

For example, in one embodiment, the energy consumed by replication of a VM is calculated according to the formula:

$$\psi_r = 3600 \times (0.512W + 20.165) \text{ [Joules]} \qquad \text{[MATH 7]}$$

Where W: The size of the VM to be migrated in megabytes.

Thereby, in such embodiment, the energy consumed by replication of the VM depends on the size of the VM to be migrated.

Of course, variants of calculation of the energy consumed by replication of a VM are conceivable. For example, in one variant, the calculated consumed energy depends on the migration moment of time as well.

For a set of requests A(t), the total energy consumed for the migration is, for all the moments of time $T_k$ considered:

$$\sum_{r \in A(t)} \sum_{k=1}^{K} M_r^k(t) \, \psi_r \theta_k(t) \qquad \text{[MATH 8]}$$

The set of request A(t) comprises N(t) requests.

Then, a mean risk is calculated during a step of calculating a mean risk 72, according to a risk metric.

The risk metric is associated with the probability, called spatial probability, for each host server, that the vehicle sending a request enters the coverage area with which the host server is associated, after leaving the current coverage area. In other words, the risk metric is associated with the accessibility of the host servers for the requesting vehicle while the vehicle is moving.

A prediction of mobility vector, which is a second spatial probability vector, is associated with each request $r \in A$ (t), denoted by $$P_{r,k}^s(t) = \left( p_{r,k,1}^S(t), \, p_{r,k,2}^S(t), \, \dots, \, p_{r,k,N_{MEH}}^S(t) \right).$$

The vector includes $N_{MEH}$ components, each component $$p_{r,k,i}^S(t)$$

representing the probability that the vehicle sending the request r(t) connects to the host server $MEH_i$ following a migration at the moment of time $T_k$. The components of the vector are organized in descending order of probability:

$$p_{r,k,1}^S(t) \geq p_{r,k,2}^S(t) \geq \dots \geq p_{r,k,N_{MEH}}^S(t)$$

For a chosen migration moment of time $T_{k*}$, the risk metric is written:

$$\text{Risk}(r(t), k^*, M_r^{k^*}(t)) = 1 - \sum_{i=1}^{M_r^{k^*}(t)} p_{r,k^*,i}^s(t) \qquad \text{[MATH 9]}$$

The mean risk is then calculated according to the formula:

$$\overline{\zeta(t)} = \frac{1}{N(t)} \sum_{r \in A(t)} \sum_{k=1}^{K} \left( 1 - \sum_{i=1}^{M_r^k(t)} p_{r,k,i}^s(t) \right) \theta_k(t) \qquad \text{[MATH 10]}$$

The mean risk is calculated for all requests processed in the time interval t.

Step 72 of calculating a mean risk is followed by a step 74 of calculating a mean availability according to an availability metric, representative of the availability of the VM following a replication, in other words, the ability to perform a complete migration of the VM before a change of host server.

For a given request, and for a migration moment of time, the duration of replication of the VM $$T_r^{Mig}$$

to a host server $MEH_i$ is calculated.

In one embodiment, the duration of replication depends on a class of service, e.g. among the following classes of services: game server, high RAM app, video streaming, face detection. Of course, the list is not exhaustive. For example, for such types of services, the estimated replication time varies between 2 seconds and 15.5 seconds in the case where the VM is a container.

The time remaining before the host server change $$T_{r,k}^{Rem}$$

is estimated, based on context data (estimation of the speed of the vehicle, network topology).

For a chosen migration moment of time $T_{k*}$, the availability metric is e.g. the indicator function denoted by Ind $$Ind(\{TT_{r,k}^{Rem} \geq T_r^{Mig}\}),$$

which is equal to 1 if the inequality is verified, and equal to 0 otherwise.

The mean availability for all requests processed during the time interval t is then written:

$$\overline{\Gamma(t)} = \frac{1}{N(t)} \sum_{r \in A(t)} \sum_{k=1}^{K} Ind(\{T_{r,k}^{Rem} \geq T_r^{Mig}\}) \theta_k(t) \qquad \text{[MATH 11]}$$

Of course, the steps 72 of calculating the mean risk and 74 of calculating the mean availability can be performed in a different order or in parallel.

A step 76 of constructing Lyapunov virtual queues implements the mean risk and mean availability values calculated beforehand, according to the following formulas:

$$Z(t+1) = \max\{0,\, Z(t) + \overline{\zeta(t)} - \varepsilon\}$$ [MATH 12]

And $$Y(t+1) = \max\{0,\, Y(t) + \gamma - \overline{\Gamma(t)}\}$$ [MATH 13]

The respective parameters $\varepsilon$ and $\gamma$ are control parameters related to the desired level of continuity of service, or in other words, to the desired quality of service.

Indeed, the first virtual queue (Z(t)) associated with the risk is incremented when the calculated mean risk exceeds the associated control parameter $\varepsilon$.

Similarly, the second virtual queue (Y(t)) associated with the availability is incremented if the calculated mean availability is less than the associated control parameter $\gamma$.

A drift plus penalty optimization is applied (step 78) according to the Lyapunov optimization method, known in the field of stochastic systems.

For the migration moment of time $T_{k*}$, $\theta_{k*}(t)$ is known. During such step, the optimal number $$M_r^{k^*}(t)$$

for each request is determined from the "objective" function $x_k(t)$ (given that $T_{k*}$ has been chosen as the optimal instant for triggering the migration).

The "objective" function for the moment $T_{k*}$ is given by the following formula:

[MATH 14]

$$x_{k*}(t) = \sum_{r \in A(t)} VM_r^{k^*}(t)\psi_r +$$

$$\frac{Z(t)}{N(t)}\left(1 - \sum_{i=1}^{M_r^{k^*}(t)} p_{r,k,i}^s(t)\right) - \frac{Y(t)}{N(t)}ind\{T_{r,k}^{Rem}(t) \ge T_r^{Mig}\}$$

$x_{k*}(t)$ naturally decomposes along r.
In order to determine the optimal value of $$M_r^{k^*}(t)$$

for each query r, each term $$VM_r^{k^*}(t)\psi_r + \frac{Z(t)}{N(t)}\left(1 - \sum_{i=1}^{M_r^{k^*}(t)} p_{r,k,i}^s(t)\right) - \frac{Y(t)}{N(t)}ind\{T_{r,k}^{Rem}(i) \ge T_r^{Mig}\}$$

is minimized individually.
Thereby:

$$M_r^{k^*}(t)^* = \operatorname*{argmin}_{M_r^{k^*}(t) \in N_{MEH}^{k^*}}\left[VM_r^{k^*}(t)\psi_r + \right.$$ [MATH 15]

-continued $$\left. \frac{Z(t)}{N(t)}\left(1 - \sum_{i=1}^{M_r^{k^*}(t)} p_{r,k^*,i}^s(t)\right) - \frac{Y(t)}{N(t)}Ind(\{T_{r,k^*}^{Rem} \ge T_r^{Mig}\})\right]$$

Where the V value is a factor for taking into account the energy consumed.

Then, in the general case, Lyapunov optimization consists in determining a number $$M_r^{k^*}(t)$$

of replication to be performed, the number $$M_r^{k^*}(t)$$

being less than or equal to the number $$N_{MEH}^{k^*}$$

of candidate host servers associated with the moment $T_{k*}$.

In one embodiment, an exhaustive search is applied, all values of $$M_r^{k^*}(t)$$

comprised between 1 and $$N_{MEH}^{k}$$

are tested, and the value $$M_r^{k^*}(t)^*$$

that minimizes $$VM_r^{k^*}(t)\psi_r + \frac{Z(t)}{N(t)}\left(1 - \sum_{i=1}^{M_r^{k^*}(t)} p_{r,k^*,i}^s(t)\right) - \frac{Y(t)}{N(t)}Ind(\{T_{r,k^*}^{Rem} \ge T_r^{Mig}\})$$

is retained, $x_{k*}(t)$ is obtained by summing the terms $$VM_r^{k^*}(t)^*\psi_r + \frac{Z(t)}{N(t)}\left(1 - \sum_{i=1}^{M_r^{k^*}(t)^*} p_{r,k^*i}^s(t)\right) - \frac{Y(t)}{N(t)}Ind(\{T_{r,k^*}^{Rem} \ge T_r^{Mig}\})$$

After having determined the $$M_r^{k^*}(t)^*$$

which minimizes the "objective" function, the predicted gain is calculated in the gain calculation step 80, the gain being equal to the value of the "objective" function $x_{k*}(t)$. for $T_{k*}$ and for the determined number of replications.

The predicted gain minimizes the replication energy for performing the number of replications $$M_r^{k^*}(t)^*$$

under the constraint of meeting the level of quality of service with regard to the risk of migration to a host server that will not be sought and the availability of the VM after replication.

In practice, $$M_r^{k^*}(t)^*$$

replications will be triggered at the chosen migration moment $T_{K*}$, towards the $$M_r^{k^*}(t)^*$$

host servers having the highest representative probabilities of prediction of associated mobilities in the prediction of mobility vector $$P_{r,k^*}^s(t).$$

FIG. 6 is a flow chart of the main steps of a method of remote execution of services according to a second embodiment, implemented by a calculation unit of a current host server. In the second embodiment, the weighting parameter $\rho$ used in the formula [MATH 2] for calculating the first probability vector is determined by the algorithm known as "doubling trick".

Unlike the first embodiment, in said embodiment, the weighting parameter $\rho$ has a value that changes dynamically, so as to ensure convergence of the implemented algorithm.

The method comprises an initialization step 90, during which a parameter C is initialized to the value:

$$C = \frac{K \ln(K)}{e - 1} \qquad \text{[MATH 16]}$$

A variable 1 is set to zero, 1 referring to an index of a period during which the value of the weighting parameter $\rho$ is constant.

In addition, the time interval index is initialized to 1, and a set of cumulative global gain values for each moment of time index $T_k$ is set to 0:

$$G_k(t = 1) = 0, \forall k \qquad \text{[MATH 17]}$$

The method comprises a step 92 of calculating a value $g_l$ of gain limit for the period of index l:

$$g_l = C \times 4^l \qquad \text{[MATH 18]}$$

At initialization, l=0 as indicated hereinabove.

The method further comprises a step 94 of calculation of the value of the weighting parameter $\rho$ as a function of the index l:

$$\rho = 2^{-l} \qquad \text{[MATH 19]}$$

The algorithm EXP3 is then implemented (step 45, comprising steps 52 to 58 described above with reference to FIG. 3) for the time interval t, with the value of the weighting parameter $\rho$ calculated during step 94. A migration moment of time $T_{k*}$ is then obtained, and an associated predicted gain $x_{k*}(t)$.

During an update step 96, the cumulative overall gain is incremented for the index k* corresponding to the selected migration moment of time $T_{k*}$:

$$G_{k^*}(t + 1) = G_{k^*}(t) + x_{k^*}(t) \qquad \text{[MATH 20]}$$

Where $x_{k*}(t)$ is the calculated predicted gain.

For the other values of k, the cumulative overall gain is unchanged: $G_k(t+1)=G_k(t)$ Then, during verification step 98, it is checked whether the maximum cumulative global gain value for the time interval t satisfies the following condition:

$$\max_k G_k(t) \le g_l - \frac{K}{\rho} \qquad \text{[MATH 21]}$$

The maximum cumulative overall gain is compared with a threshold that depends on the number K of moments of time, as well as on the current weighting value $\rho$.

If the cumulative overall gain is less than the threshold, the time interval index is incremented during the incrementation step 100 (t←t+1), and step 45 of implementing the EXP3 algorithm for interval t+1 is executed, with the same weighting parameter value $\rho$ as before.

If the condition verified in the verification step 98 is not satisfied, i.e. if the cumulative overall gain is greater than the threshold $$\left( \max_k G_k(t) > g_l - \frac{K}{\rho} \right),$$

then step 98 is followed by a step 104 of incrementing the index l referring to the period during which the value of the weighting parameter $\rho$ is constant l←l+1, and by an update of the values of the weighting parameter and the gain terminal $g_l$.

Similarly to step 100, the time interval index is incremented during step 106.

Step 106 is followed by step 92 of calculation of a gain limit value $g_l$ for the index period l (for the new index value l), then step 94 of calculating a value of the weighting parameter $\rho$ as a function of the index l. The step 45 of implementation of the EXP3 algorithm for the interval t+1 is executed, with the calculated value of the weighting parameter ρ.

According to alternative embodiments, in the method of the invention, the energy consumed for the migration depends on other parameters, e.g. on the migration moment of time.

Advantageously, the choice of the migration moment of time for each request is optimized as a function of a sum of gains associated with migrations of previous requests over a succession of moments of time.

Advantageously, the predicted gain for each request, for the selected migration moment of time and the determined number of replications, depends on the energy consumed for performing the replications, the risk metric and an availability metric, and of control parameters associated with a desired level of continuity of service. Thereby, the invention makes it possible to define a plurality of levels of continuity of service and to determine a migration moment of time for a chosen level of continuity of service.

Advantageously, for each level of continuity of service, the replication energy is minimized.

Advantageously, the proposed method is executable on a plurality of requests, coming from one or a plurality of mobile devices, over successive time intervals, and for each request, the weights used in the calculation of the components of the probability vector associated with the migration moments of time are updated according to the predicted gains.

The invention claimed is:

1. A method of remote execution of services required by at least one mobile device, in particular on board a vehicle, via a cellular communication network according to a communication protocol of at least fourth generation, a service being executed by a virtual machine of a computing server, referred to as the current host server, the mobile device sending a service request having a position belonging to a geographical area of current cellular communication coverage, said current host server being associated with the geographical area of current coverage, the method being implemented by a processor of said current host server (MEH$_c$), for a given service request, received during a current time interval and comprising:

a) for the current time interval, calculating a probability vector with K components, each component being associated with a given moment of time of a predetermined set of K moments of time, each component of the probability vector corresponding to a probability of migration at the associated moment of time, the migration consisting of at least one replication of the virtual machine executing said service on a chosen host server belonging to a geographical area of coverage contiguous to said current geographical area of coverage, the calculation of the components of the probability vector implementing a set of K weights, each weight being associated with a migration moment of time and representative of a gain predicted for a migration at said associated migration moment of time, b) selecting from said set of K moments of time of a moment of time, referred to as the selected migration moment of time, according to the calculated probability vector, the selected migration moment of time having a maximum corresponding probability of migration in the calculated probability vector, and c) determining, for the migration at the selected migration moment of time, of a number of replications of the virtual machine to be performed at the selected migration moment of time so as to minimize a cost in terms of replication energy while ensuring a level of continuity of service, and calculation of a predicted gain for said migration at the selected migration moment of time.

2. The method according to claim 1, further comprising storing in a storage the selected migration moment of time and the number of replications of the virtual machine to be performed for said given service request.

3. The method according to claim 1, implemented by said current host server for a plurality of service requests over a succession of time intervals, the method further comprising:

d) updating of the weight associated with the selected migration moment of time, for a following time interval, the update depending on said predicted gain, and repeating of steps a) to d) for the following time interval.

4. The method according to claim 3, wherein the update of the weight implements an exponential function of said predicted gain, and the probability associated with the selected migration moment of time for the current time interval.

5. The method according to claim 4, wherein the weight associated with the selected moment of time for the following time interval is obtained by the formula:

$$\omega_{k*}(t+1) = \omega_{k*}(t)e^{\frac{\rho x_{k*}(t)}{K p_{k*}(t)}}$$

where k* is the index of the selected migration moment of time, $\omega_{k*}(t)$ is the weight associated with the selected moment of time for the current time interval (t), $\omega_{k*}(t+1)$ is the weight associated with the selected moment of time for the next time interval, ρ is a weighting parameter, $p_{k*}(t)$ and is the probability associated with the selected migration moment of time.

6. The method according to claim 5, wherein, for the current time interval, the probability associated with the moment of time $T_k$ of index k is calculated by the formula:

$$p_k(t) = (1-\rho)\frac{\omega_k(t)}{\sum_{j=1}^{K}\omega_j(t)} + \frac{\rho}{K} \text{ for any } k \in \{1, 2, \ldots, K\}$$

7. The method according to claim 5, wherein the weighting parameter is calculated dynamically based on a calculation of cumulative global gain for each moment of time, the cumulative global gain being incremented, for each moment of time, for each service request processed, by the predicted gain for migration when said moment of time is selected as the migration moment of time.

8. The method according to claim 7, wherein the weighting parameter value is changed when the maximum cumulative overall gain among said calculated overall gains exceeds a threshold dependent on the number of moments of time.

9. The method according to claim 1, wherein determining, for a migration at the selected migration moment of time, for each service request, a number of replications of the virtual machine to be performed at the selected migration moment of time, each replication being performed on a selected host server, implements a minimization of an target function depending on an energy consumed for said number of replications, under the constraint of a risk metric associated with the accessibility of the host server(s) chosen for the replication and of an availability metric, for each replication, of the virtual machine triggered after the replication triggered at the selected migration moment of time.

10. The method of claim 9, wherein the risk metric uses a probability representative of a prediction of mobility associated with each selected host server, representative of the probability that the mobile device sending said service request enters a geographical coverage area associated with said chosen host server.

11. The method according to claim 10, wherein for a selected migration moment of time, and for a given request r(t), said risk metric is defined by:

$$\text{Risk}\left(r(t)k^*, M_r^{k^*}(t)^*\right) = 1 - \sum_{i=1}^{M_r^{k^*}(t)^*} p_{r,k^*,i}^s(t)$$

where k* is the index of the selected migration moment of time $$M_r^{k^*}(t)^*$$

is the number of replications of the optimal virtual machine calculated, and $$p_{r,k^*,i}^s(t)$$

is the probability representative of a prediction of mobility associated with a host server of index i.

12. The method according to claim 9, wherein the availability metric uses, for each replication of virtual machine, a comparison of a migration moment of time of the virtual machine and of a time remaining before a change of host server for the mobile device sending said service request.

13. The method according to claim 9, wherein said consumed energy is calculated based on the number of replications and a size of the virtual machine to be migrated.

14. The method according to claim 9, wherein said determination, for the migration at the selected migration moment of time, for each service request, of a number of replications of the virtual machine to be performed at the selected migration moment of time implements, for a plurality of service requests received over a current time interval, a mean risk calculation and a mean availability calculation availability over said plurality of requests.

15. The method according to claim 14, wherein said calculated mean risk for the current time interval is used to construct a first virtual queue, for a subsequent time interval, according to an associated first control parameter, and said mean availability is used to construct a second virtual queue, for a subsequent time interval, depending on an associated second control parameter, the objective function to be minimized being dependent on said first and second virtual queues.

16. The method according to claim 9, wherein, for a given service request, and for a selected migration moment of time, the predicted gain is equal to the value of said objective function for the determined number of replications of the virtual machine.

17. The method according to claim 1, wherein a maximum number of candidate host servers is associated with each moment of time, the maximum number of candidate host servers associated with each moment of time decreasing in the ascending order of moments of time.

18. A computer program including software instructions which, when executed by a programmable electronic system, implement a method of remote execution of services required by at least one mobile device according to claim 1.

19. A method of remote execution of services required by at least one mobile device, in particular on board a vehicle, the system including a cellular communication network according to a communication protocol at least of fourth generation, and a plurality of computing servers, a service being executed by a virtual machine of a computing server, known as the current host server, the vehicle sending a service request having a position belonging to a current geographical area of cellular communication coverage, said current host server being associated with the current geographical area of coverage, said current host server including a processor configured to implement, for a given service request received during a current time interval belonging to a succession of time intervals:

a module for calculating, for the current time interval, calculation of a probability vector with K components, each component being associated with a given moment of time of a set of K predetermined instants, each component of the probability vector corresponding to a probability of migration at the associated moment of time, the migration consisting of at least one replication of the virtual machine executing said service on a chosen host server belonging to a geographical area of coverage contiguous to said geographical area of current coverage, the calculation of the components of the probability vector implementing a set of K weights, each weight being associated with a migration moment of time and representative of a gain predicted for a migration at said associated migration moment of time, a module for selecting, from said set of K moments of time, a moment of time, referred to as the selected migration moment of time, according to the calculated probability vector, the selected migration moment of time having a maximum corresponding probability of migration in the calculated probability vector, a module for determining, for the migration at the selected migration moment of time, a number of replications of the virtual machine to be performed at the selected migration moment of time so as to minimize a cost in terms of replication energy while ensuring a level of continuity of service, and calculation of a predicted gain for said migration at the selected migration moment of time.

20. The system according to claim 19, further including a module for updating the weight associated with the selected migration moment of time for a subsequent time interval, the update depending on said predicted gain.

* * * * *